United States Patent [19]
Köchy et al.

[11] Patent Number: 4,597,461
[45] Date of Patent: Jul. 1, 1986

[54] VEHICLE HAVING PRE-ASSEMBLED CONSTRUCTIONAL UNIT FOR THE COCKPIT REGION THEREOF

[75] Inventors: Fritz Köchy, Mainz; Klaus Brandel, Worrstadt; Horst Hullmann, Florsheim; Bernhard Neumann, Russelsheim; Gerhard Helmsing, Eppstein, all of Fed. Rep. of Germany

[73] Assignee: General Motors Corporation, Detroit, Mich.

[21] Appl. No.: 601,446

[22] Filed: Apr. 18, 1984

[30] Foreign Application Priority Data

Apr. 29, 1983 [DE] Fed. Rep. of Germany ....... 3315646

[51] Int. Cl.⁴ .............. B60K 26/00; B60K 37/00; B62D 25/14; B62D 65/00
[52] U.S. Cl. .......................... 180/90; 296/72; 296/194; 296/197
[58] Field of Search ............. 180/11, 12, 90; 296/70–74, 192, 197, 29, 191, 194

[56] References Cited

U.S. PATENT DOCUMENTS

| | | | |
|---|---|---|---|
| 1,873,894 | 8/1932 | Kimbell | 296/29 X |
| 3,151,573 | 10/1964 | Eggert | 296/29 X |
| 3,789,945 | 2/1974 | Hansen | 180/90 X |
| 4,126,202 | 11/1978 | Hern | 180/90 X |
| 4,353,430 | 10/1982 | Sjoqvist | 180/90 |
| 4,391,465 | 7/1983 | Piano | 296/192 X |
| 4,432,565 | 2/1984 | Suzuki | 180/90 X |
| 4,466,654 | 8/1984 | Abe | 296/194 X |

FOREIGN PATENT DOCUMENTS 466214 5/1937 United Kingdom ............... 180/12

*Primary Examiner*—Robert G. Nilson
*Attorney, Agent, or Firm*—William A. Schuetz

[57] ABSTRACT

A pre-assembled module for the cockpit zone of a motor vehicle, especially a passenger car, which is adapted to be mounted as one single unit inside the vehicle body and which incorporates essentially the following components: an instrument board including all instruments and accessories commonly contained therein, fuse box and electric wiring, heater with controls and air distribution system; furthermore a steering system including steering wheel, steering column enclosure and steering support means; also pedals for clutch and brake, including mounting brackets. The vehicle body includes a fire wall and fire wall support member to which the aforementioned components and accessories are connected when in the installed position. The fire wall and fire wall support member are separated from the body shell and serve as an assembly base for the unit. In the installed position, the fire wall and fire wall support member are sealingly connected with the respective adjacent body panels. The advantage of a unit as described in the foregoing specifications is that those components which are commonly considered to be part of the cockpit zone, but which are situated on the other side of the fire wall, i.e., in the engine compartment, can also be incorporated into the pre-assembly operation of the module. This simplifies assembly operations to a great extent and reduces the over-all manufacturing costs of the vehicle.

6 Claims, 13 Drawing Figures

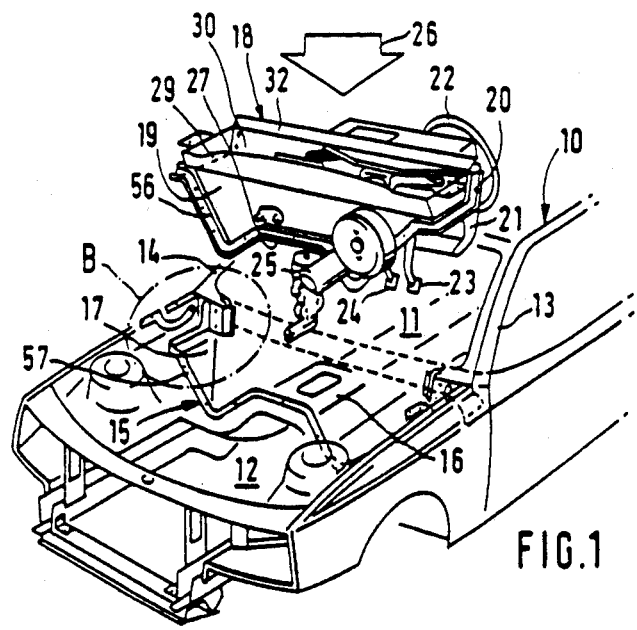
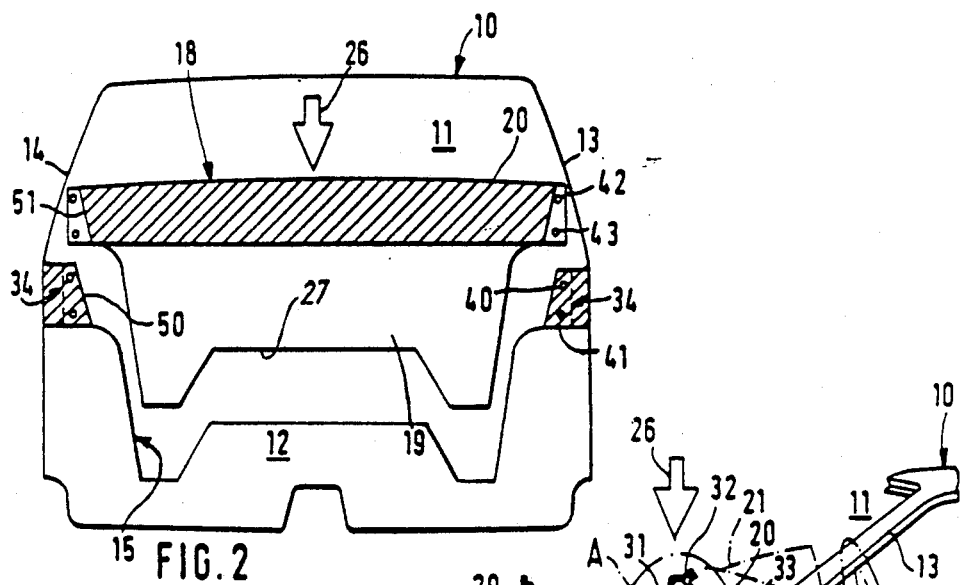
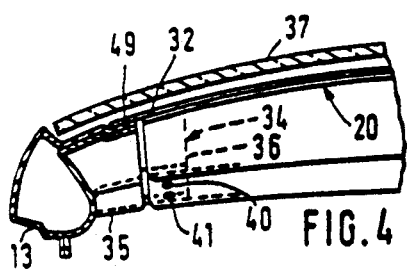

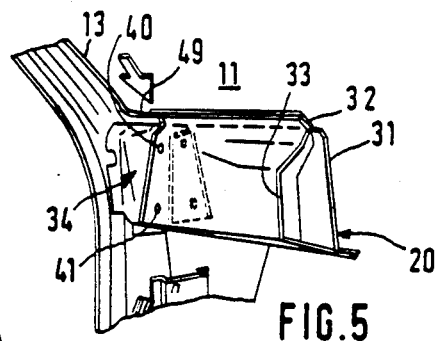
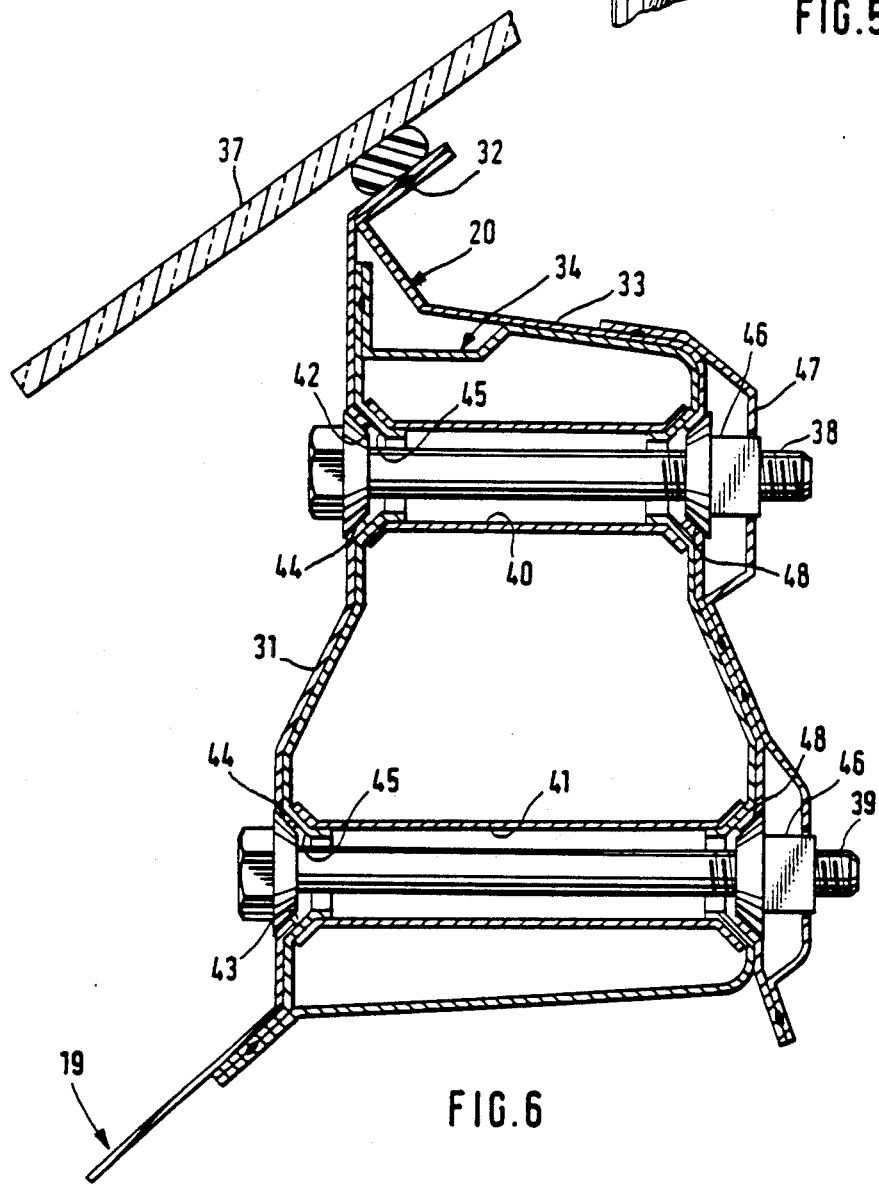

VEHICLE HAVING PRE-ASSEMBLED CONSTRUCTIONAL UNIT FOR THE COCKPIT REGION THEREOF

The invention relates to a pre-assembled module for the cockpit station of a motor vehicle, especially a passenger car, which is adapted to be mounted as a unit inside the vehicle body and which incorporates essentially the following components: an instrument board including all instruments and accessories commonly contained therein, fuse box and electrical wiring, heater with controls and air distribution system, antenna; furthermore a steering system including a steering wheel, steering mechanism, steering column tube and steering support means; as well as pedals for clutch, brake and accelerator, including mounting brackets; servo brake unit, windshield wiper system, heater fan, air conditioning, etc. The vehicle body includes a fire wall and a fire wall cross member (so-called steering cross member) to which the aforementioned components and accessories are directly or indirectly connected when in the installed position.

In the manufacture of motor vehicles there is a growing trend to combine several components into one pre-assembled unit and to install this larger unit as a module into the vehicle. In contrast to the earlier practice of installing individual components separately into the vehicle, this technique assists in improving and facilitating assembly operation to a considerable extent.

In motor vehicles, and especially passenger cars, the cockpit zone is the most assembly-intensive area of the body, because it is in this area that a great variety of components and controls are concentrated within a limited amount of space. In addition, a great number of comfort accessories, such as heating and air conditioning components, radio, etc. are situated in this cockpit area.

One pre-assembled unit of this type, which is also known in the field by the term cockpit module, has been disclosed in U.S. Pat. No. 4,126,202. This prior art cockpit module, which is designed for tractors, is mounted on a box-like frame on which the instrument panel, steering, pedals and other components and instruments situated in the vehicle occupant compartment are combined into one single unit that is adapted for ready installation into the body of the tractor.

Another pre-assembled modular unit of the aforegoing type, which has been disclosed in the German patent application No. P 31 49 083.2-21, has become state-of-the-art technology. In this arrangement, numerous components and accessories of the cockpit area are being pre-assembled on a frame which, after installation of the unit in the vehicle, is removed again from the vehicle body. A fire wall locking plate is provided in this arrangement which permits some of the more important components and wire harnesses to be placed from the occupant compartment through the fire wall into the engine compartment.

These prior art arrangements constitute an important technological step in the direction towards simplifying and facilitating assembly operations. Nevertheless, some other assembly operations in the cockpit area must still be carried out right on the vehicle. This will become apparent if one realizes that the cockpit zone does not only incorporate instruments, controls and accessories located on the vehicle occupant side, but also those located in the engine compartment. Some of these controls and components must first be moved through the fire wall and subsequently be installed in the engine compartment.

It is the object of the present invention to provide a pre-assembled module of the aforegoing type and to propose means by which also those components, accessories and controls of the cockpit zone that are located on the other side of the fire wall, i.e., in the engine compartment, are adapted to be integrated into the pre-assembled module.

This objective is being achieved in that the fire wall and fire wall support member are separated from the body shell so as to serve as a pre-assembly base for the unit, and in that the fire wall and fire wall support member are adapted for sealing connection with the respective adjacent body panels when the module is in the installed position.

In conjunction with these objectives, some important assembly procedures are being proposed, which are to the effect that the pre-assembled unit is lowered through the opening provided in the body for the windshield, and is subsequently sealingly connected, together with the fire wall and fire wall cross member, to the adjacent body panels, i.e., the windshield and engine hood are secured to the body after installation of the pre-assembled module into the body shell.

The invention enables the following important accessories, components and controls to be included into the pre-assembled unit: steering mechanism, booster, brake adjustment mechanism, windshield wiper system including windshield wiper motor, heater fan, air conditioning blower and air ducts, bowden cables for hood, headlight adjustment, etc., insulating mat engine compartment, insulating mat passenger compartment, water container, windshield washer and headlight cleaning system, cooler for water compensating container, console (occupant compartment) as well as any other part and components attached to the outer or inner side of the fire wall, e.g. electric or electronic components (computers, anti-skid system, etc.).

The basic concept embodied in the invention is that the fire wall and fire wall support member are not integral components of the body shell, but are separate and independent components adapted to serve as a preassembly base for the cockpit unit. This arrangement enables all parts and components located forwardly or rearwardly of the fire wall, and those that are extending through the fire wall, to be pre-assembled into a complete cockpit module at a location outside of the body on a specially designed (assembly-optimized) assembly line and to subsequently drop this preassembled unit into the body shell.

Another advantage of the invention is that there is no need for a separate assembly frame that must be removed from the body after installation of the pre-assembled unit, because the function of an "assembly frame" is, in accordance with the invention, assumed by the fire wall and fire wall support member which, upon installation of the cockpit module, will remain in the body and become an important component thereof.

Another advantage of the invention is that a number of "blind" assembly operations are eliminated which in the past have been the cause of defects and faults. All assembly operations can now be carried out at normal body postures, i.e., the assembly line operator is not required to assume uncomfortable postures when installing the same components into the body.

The pre-assembled module can be tested prior to its installation into the car. Sources of malfunctioning can be traced and detected on a diagnostic test stand by using a multi-conductor plug which, after installation of the unit, serves as a connection between the entire electric system and the wire harness, and the faults can be rapidly and easily corrected.

In conclusion it can be stated that as a result of the improved assembly procedures in accordance with the invention and the test capabilities afforded thereby, the malfunctioning rate of vehicles assembled by mass production techniques can be considerably reduced and the costs for associated corrective work can thus be eliminated. The arrangement according to the invention also results in improved productivity and ergonomic working conditions and, consequently, increases the operational reliability of those vehicles that have been assembled by this method.

Further advantageous configurations of the invention will become apparent from the claims contained in this patent as well as the drawings and specifications taken in conjunction with the exemplary embodiments.

In the drawings:

FIG. 1 is a perspective illustration of the forward half of a passenger car body;

FIG. 2 is a cross-sectional view (schematic) of a passenger car body;

FIG. 3 is a partial side elevation of a passenger car body;

FIG. 4 is a horizontal cross-sectional view (left side) of the area A-pillar/windshield, illustrated on an enlarged scale as compared with FIGS. 1–4;

FIG. 5 is a perspective illustration of the area according to FIG. 4 (as viewed from the passenger compartment);

FIG. 6 is the detail "A" of FIG. 3 in assembly position and illustrated on an enlarged view in comparison to FIG. 3;

Figure 9:
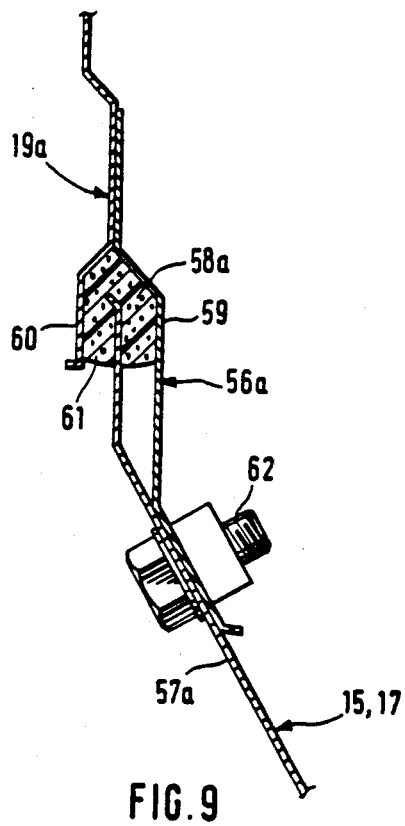
Figure 10:
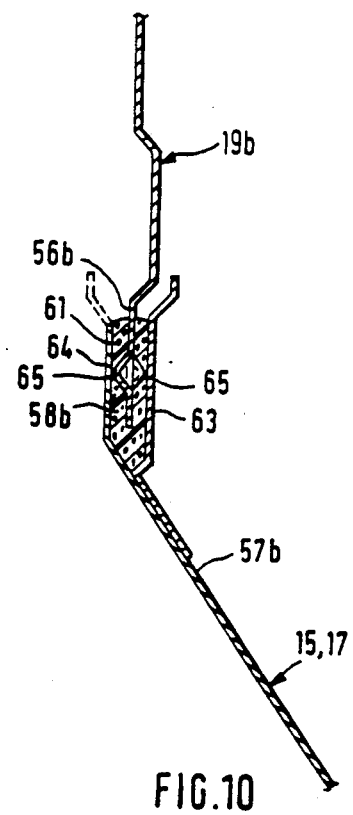
Figure 11:
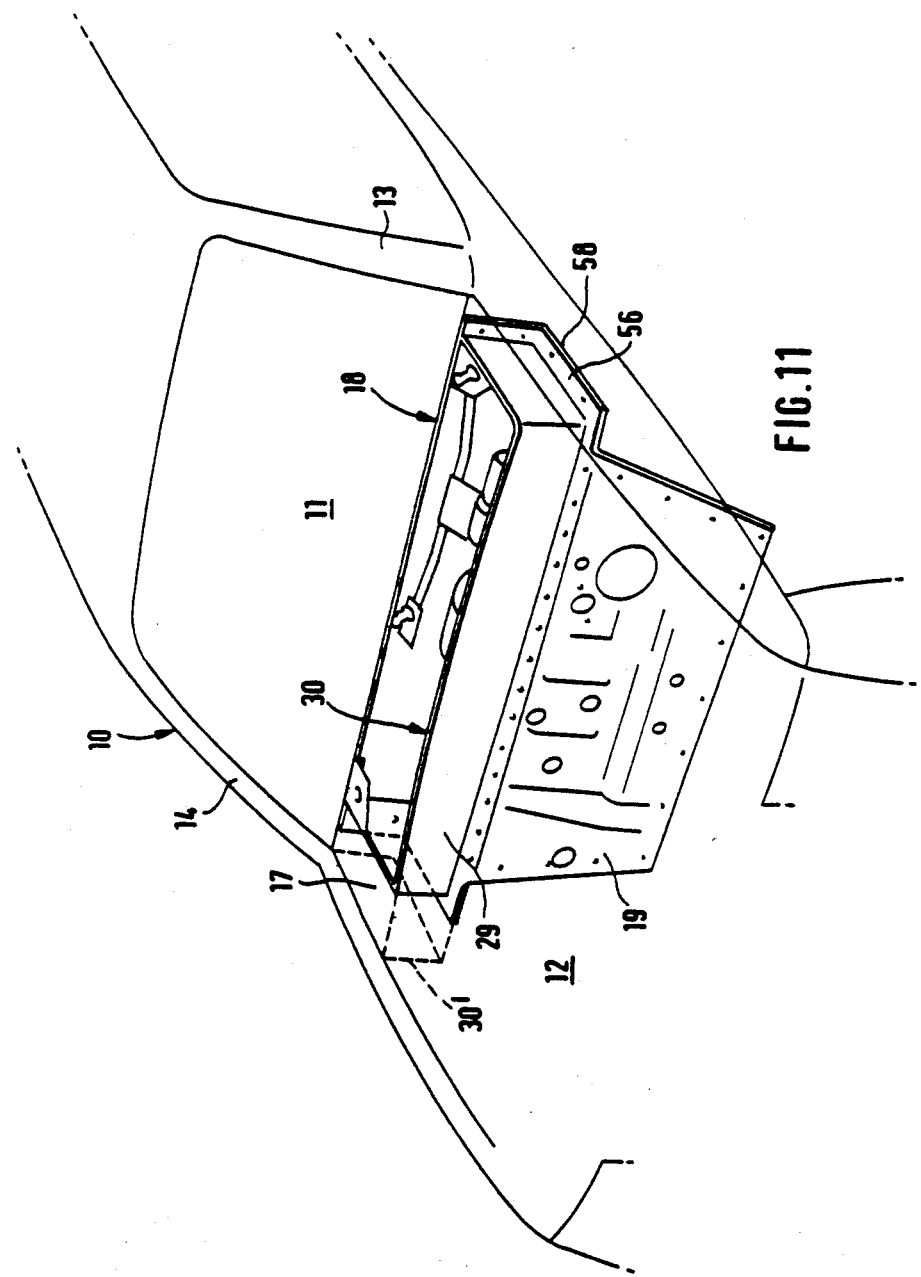
Figure 12:
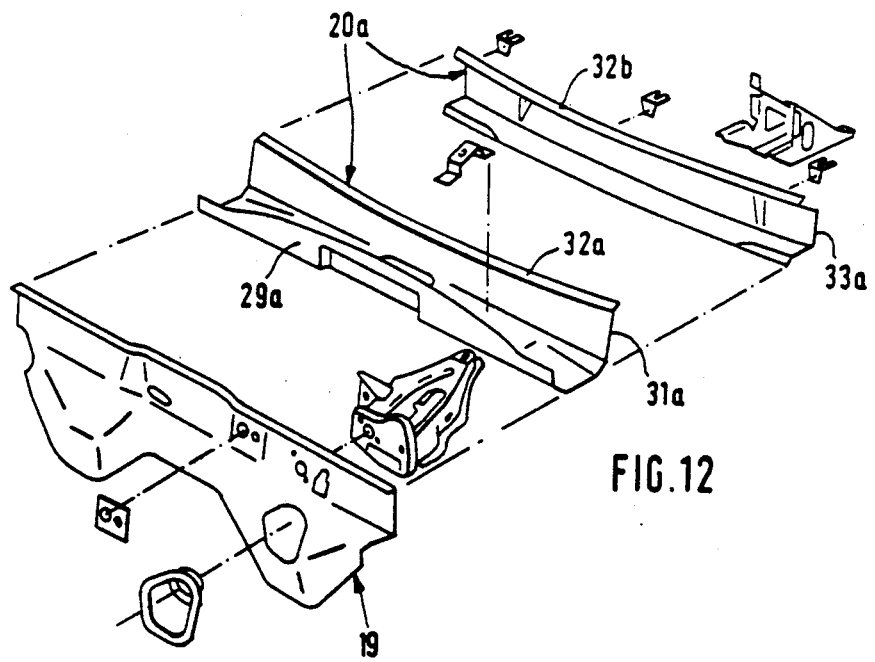
Figure 13:
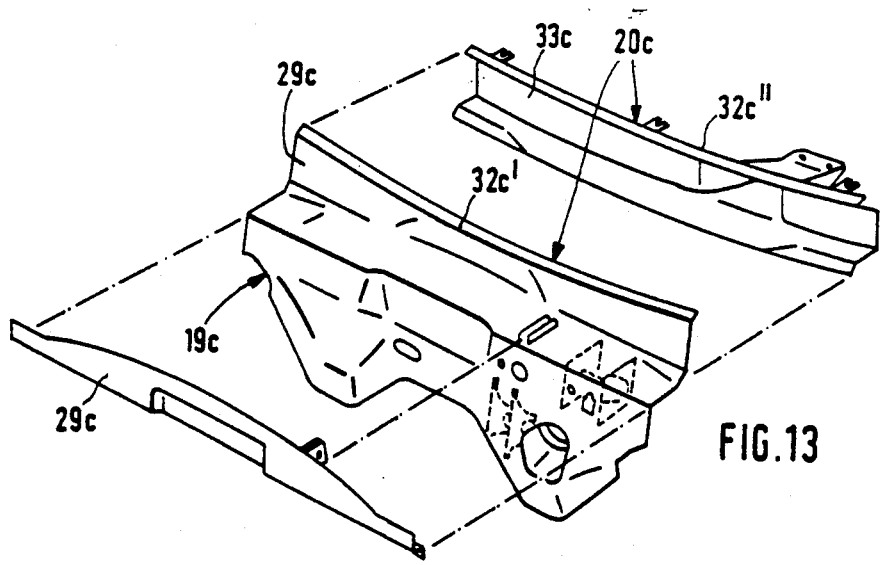

FIGS. 9 and 10 each illustrate, in crosssection, one embodiment of a sealing connection between the fire wall and the adjacent panels of a passenger car;

FIG. 11 is a representation similar to FIG. 1, but with the pre-assembled unit being in the installed position, and FIGS. 12 and 13 are exploded views of two different embodiments of a fire wall and fire wall support member of a passenger car body.

Referring to FIGS. 1–5, numeral 10 denotes a pre-assembled body shell of a passenger car. An opening in the body 10 for the windshield is designated by the numeral 11. The engine compartment, which is open at the top (prior to installation of the hood), is designated by the numeral 12. The A-pillars, which are the lateral boundaries of the opening for the windshield, are denoted by the numerals 13 and 14. One will also notice inside the body shell 10 a substructure or bottom support portion 15 with transmission tunnel 16, including the lateral panels or side support portions 17.

Also shown in FIG. 1 is the pre-assembled module 18, which is illustrated in a suspended position (without the supporting rig) immediately above the body shell 10. This unit is the cockpit station of the vehicle, also termed the cockpit module. One important component of the unit 18 is the fire wall 19, because it serves as an assembly base for said unit, and a transversely extending fire wall support member 20 positioned above the fire wall 19. The fire wall 19 and fire wall cross member 20, which are normally part of the body shell 10, are initially separated from the body and retained on a separate assembly line (not shown) together with the pre-assembled unit 18 so as to serve also as a support frame for said unit.

FIG. 1 illustrates, furthermore, a number of other components which make up the pre-assembled cockpit unit: instrument panel 21, steering wheel 22, clutch pedal 23, brake pedal 24, steering mechanism 25 etc. A complete breakdown of the parts, components and controls contained in the pre-assembled unit is listed above. Thus, it should be noted that the unit 18 not only contains components disposed in the cockpit area of the occupant compartment, but also various components situated on the other side of the fire wall, i.e., in the engine compartment.

The installation of the pre-assembled unit, which is illustrated in FIGS. 1 and 2 suspended above the body i.e., in a position prior to its installation, starts from the top and proceeds downwardly (direction of arrow 26 in FIGS. 1–3), i.e. the unit is lowered through the windshield opening 11 and through the engine compartment 12. As is apparent from the contours of the fire wall 19, especially in FIG. 1 (one should take notice especially of the cutout 27 for the transmission tunnel), the fire wall 19, when in the installed position, abuts against the adjacent side walls, e.g. 17, of the vehicle substructure 15 and is fixedly connected therewith.

More details concerning the structure and arrangement of fire wall 19 and fire wall support member 20 are disclosed in FIG. 3 (see also FIGS. 12 and 13 as well as other pertinent information below in this text). Referring to FIG. 3, the fire wall 19 is comprised of a sheet metal member having several bends. After extending vertically for a short stretch (i.e. the actual body fire wall), the sheet metal member is bent rearwardly at a right angle and then extends upwardly again to form, together with another sheet metal member 29 welded thereto at 28, the so-called water box 30. The fire wall support member 20, which has a reversed U-profile configuration at the ends, and whose mid-portion is of box-like configuration, is also formed in part by the fire wall sheet metal member 19, as illustrated in FIG. 3. One leg of the U-profile of the fire wall support member 20 is formed by the previously mentioned upwardly extending end 31 of the fire wall sheet metal member 19 and is welded at 32 to the other leg of the U-profile of the separate sheet metal member 33 forming the fire wall support member 20. As is also apparent from the drawings, especially FIGS. 2–6, the fire wall support member 20 is adapted in its installed position for threaded connection on both sides with the body 10. For this purpose, the A-pillars 13, 14 of the body 10 are each provided with mounting flanges 34. As is apparent especially from FIGS. 2–5, the mounting flanges for the support memmber are fashioned into the A-pillars 13, 14 and the wheel mounting panels 17 (see FIG. 1). The portion of the mounting flange 34 associated with the A-pillar 13 is denoted in FIG. 4 by the numeral 35, whereas the portion of the mounting flange 34 associated with the panel 17 is denoted by the numeral 36 in the same figure. In order to further illustrate the installation arrangements for the fire wall support member 20, a portion of the windshield is included in FIG. 4 and is denoted by the numeral 37.

The connection between the fire wall support member 20 and the mounting flanges 34 is established, as illustrated in FIG. 6, by means of a pair of threaded bolts 38, 39, which extend through a pair of bolt conduits 40, 41, and 42, 43 provided on the respective support flange 34, i.e. on the associated end of the fire wall support member 20. FIG. 6 illustrates that the heads of the bolts 38, 39 are provided with conical surfaces 44, which cooperate with corresponding conical recesses 45 in the support flanges 34, so as to cause upon tightening of the bolts 38, 39, a so-called conical draw in the area of the fire wall support sheet metal member 31 surrounding the conical surfaces 44. At the ends of the bolts 38, 39 there is a corresponding conical draw in the areas of the sheet metal member 33 of the fire wall support member 20 surrounding the bolts 38, 39. There, the threaded nuts 46, which are retained on the fire wall support member 20 by a locking member 47, are also provided with conical surfaces, which are denoted by the numeral 48. The conical draw illustrated in FIG. 6 and described in the foregoing helps to establish a solid connection between the fire wall support member 20 and the mounting flanges 34 and prevents relative displacement of the parts.

Furthermore, FIGS. 4 and 5 illustrate that each mounting flange is provided with a windshield flange 49 which serves as a support for bonded windshields or for the retention of windshield frame rubber members. At its upper edge, the fire wall support member 20, too, is formed at its upper edge into a windshield flange 32 in such a manner that the windshield flanges 49 of the mounting flanges 34 and the windshield flange 32 of the fire wall support member 20 are combining, when in the installed position, to form one single windshield flange. The windshield flange portions 49 associated with the mounting flanges 34 are each provided on both sides with an offset extension (see especially FIG. 4) which serve as mounting means for the windshield flange portion 32 formed onto the fire wall support member 20 so as to provide that the surfaces of the windshield flange portions 49, 32 are flush when in the installed position. The offset extensions of the windshield flange portions 49 are also serving as a means for locating the installation position of the unit 18 in vertical direction.

It is also apparent from FIGS. 2 and 3 (see also FIG. 6) that the surfaces (e.g. 50, 51 in FIG. 2) of the mounting flanges 34 and the fire wall cross member 20, which are cooperating with one another upon installation of the unit 18, are slanted so as to provide proper horizontal centering with regard to the installation position of the unit 18. The slanted surfaces 50, 51 also serve to locate the unit 18 transversely with respect to the longitudinal direction of the vehicle.

Figure 7:
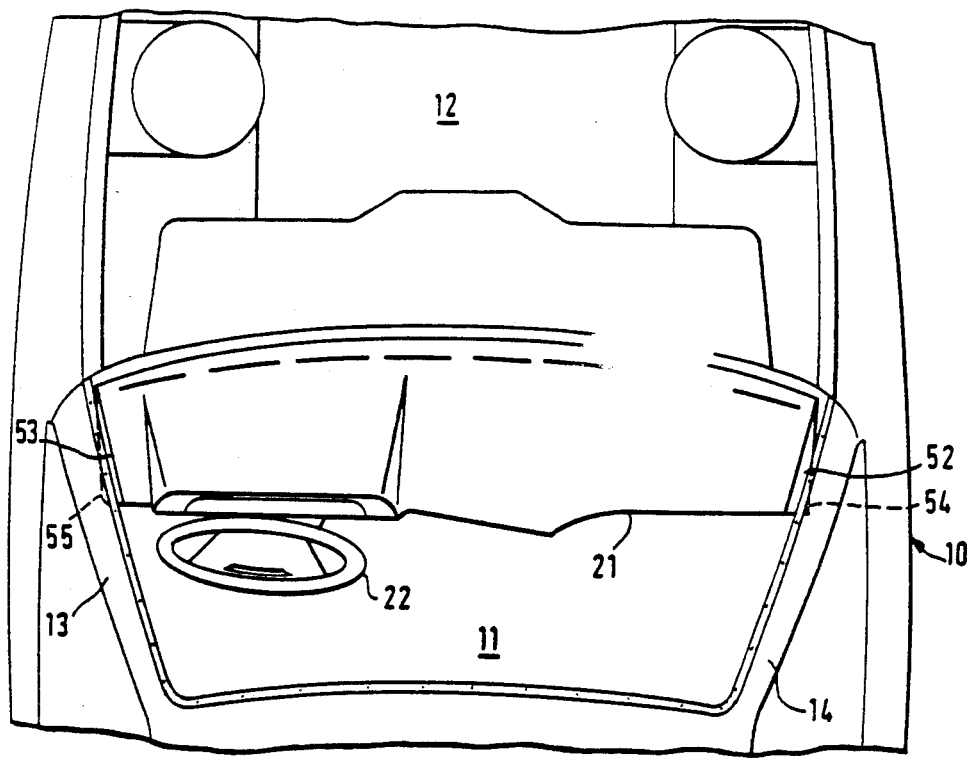
FIG. 7 is a plan view of the front portion of a passenger car body (schematic)

It is apparent from FIG. 7 that both ends of the instrument panel 21 must be slanted at 52, 53, so that their contours corresponds to the respective dimensions of the opening 11 for the windshield, which is also provided with slanted surfaces at both ends. This will eliminate initially the triangular end portions 54, 55 indicated in FIG. 7 by the dotted lines. However, with the instrument board 21 in the installed position, the inside paneling of the respective A-pillars 13, 14 serve as substitutes for the missing end portions 54, 55.

Figure 8:
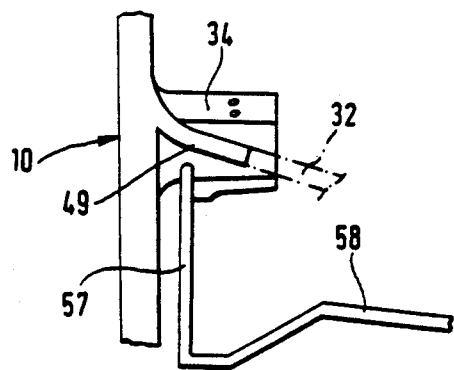
FIG. 8 is the detail "B" of FIG. 1 as seen in plan view and illustrated on an enlarged scale, as compared to FIG. 1.

In reviewing once more the illustration of FIG. 1, it will become apparent that the entire fire wall is provided with a horizontally bent flange-like edge 56 which is adapted to sealingly engage a correspondingly formed edge provided on the adjacent body walls 15 (see also FIG. 8). It is also apparent from FIGS. 1 and 8 that the cooperating edges 56, 57 of fire wall 19 and adjacent body walls 15, 17, respectively, starting from the windshield flange 32, 49 and extending over the wheel enclosure panel 17 and substructure 15, are forming a sealing channel 58 to be filled with a hardenable sealing agent, and are adapted to be sealingly joined to one another downwardly of the sealing channel 58.

Two exemplary design configurations of the sealing channel 58 are illustrated in FIGS. 9 and 10, respectively. In the arrangement according to FIG. 9, the sealing channel is denoted by the numeral 58a. The fire wall 19a is provided at its edge 56a with a doubled wall 56a, the wall portions 59, 60 forming the sealing channel 58a. The edge 57a of the body substructure 15, 17 is extending from below into the sealing channel 58a. The adhesive placed into the sealing channel 58a may be of the polyurethane type and could also be used for bonding the windshield to the body. The connection between the edges 56a, 57a of the fire wall 19a and the substructure 15, 17 is also made by means of threaded bolts 62, one of them being shown in FIG. 9 and denoted by the numeral 62.

By contrast, in the embodiment shown in FIG. 10, the edge 57b of the body for connecting the edge 56b with the fire wall 19b is of the double walled type, with two wall portions 63, 64 being provided which are defining the sealing channel 58b. The edge 56b of the fire wall 19b extends, when in the installed position, into the sealing channel 58b from above. The sealing channel is filled with a hardenable adhesive 61, e.g. a polyurethane adhesive. The flange 56b of the fire wall 19b to be bonded extends into the hardenable adhesive 61 and is provided with spacer nipples 65. This will ensure proper bonding of the flange-like edges 56b, 57b on both sides. A threaded connection between the edges 56b, 57b is not considered to be necessary in this embodiment.

The perspective representation of FIG. 11 illustrates the cockpit module 18 in the installed position inside the vehicle body. FIG. 11 also illustrates two different configurations of the water box 30. In the configuration illustrated in solid lines, the water box 30 is closed at both sides, leaving a distance between it and the body panels 17. But it is also possible to have the water box 30 extend right up to the adjacent panels 17, as indicated by the broken lines 30'. Naturally, the configuration indicated by the broken lines shown on the right hand side of the vehicle is also applicable to the left hand side of the vehicle, and the illustration of this modification has therefore been omitted on that side.

FIGS. 12 and 13 illustrate two different configurations of the fire wall including the fire wall support member 20. FIG. 12 shows a more conventional arrangement of a fire wall 19 and fire wall support member 20 composed of several sheet metal members which, as apparent from FIG. 3, are adapted to be joined to one another. However, in the embodiment according to FIG. 12 the configuration of the individual sheet metal member differ somewhat from those illustrated in FIG. 3. For example, in FIG. 12 the water box 30 formed by the sheet metal members 29a and 30a is made of one single piece, whereas the water box 30 according to FIG. 3 is made up of two sheet metal members 29, 31 welded together at 28. However, the fire wall support member illustrated in FIG. 12 is also made up of two sheet metal members, i.e., members 31a and 33a which are adapted to be joined to one another at their respective upper edges 32a and 32b.

The embodiment illustrated in FIG. 13 differs substantially from that in FIG. 12 in that the members forming the fire wall 19c and fire wall support member 20c are all made of plastics. This arrangement provides that the number of members to be combined, so as to form the structural element fire wall/fire wall support member, can be reduced to three. In this embodiment, the water box is comprised, similar to the embodiment shown in FIG. 3, of fire wall member 19c which is provided with several bends, and its end member 29c to which a separate wall member 29c is attached. The fire wall member 20c is comprised, like that illustrated in FIG. 3, of the members 29c and 33c, which are joined to one another, preferably by welding, at their upper edges.

In conclusion, it should be mentioned again that the unit 18 is installed into the vehicle body in a downward direction (arrow 26 in FIGS. 1, 2 and 3) through the opening 11 provided for the windshield and through the open engine compartment 12, and is subsequently mounted, as described in detail in the aforegoing text, to the respective body members. Subsequently, the windshield 37 and the engine hood (not shown) are mounted to the body.

The embodiments of the invention in which an exclusive property or privilege is claimed are defined as follows:

1. In an automotive vehicle having a vehicle body shell including a pair of horizontally spaced generally vertically extending side pillars for receiving a windshield and body side and bottom structure which defines a passenger compartment and an engine compartment, a preassembled module including a dashboard with various vehicle accessories mounted thereto and accessible from the passenger compartment which is connected as a unit to the vehicle body structure, the improvement being that said module includes a base extending transversely of the vehicle body shell and which forms a fire wall for the vehicle to separate the engine compartment from the passenger compartment and having a first side to which the dashboard and dashboard mounted accessories are preassembled and a second side facing the engine compartment to which various engine compartment accessories are assembled, said module having first tapered connecting means which cooperably engage second tapered connecting means secured to said side body structure, upon the module being lowered through the windshield opening, to connect said module to said body shell and to automatically position said module relative to said body shell, means for securing said first and second connecting means together and sealing means for sealing the base of the module along its lower and side periphery to said body shell.

2. In an automotive vehicle in accordance with claim 1 and wherein one of said base and said body shell at its side and bottom structure along its periphery terminates in a channel and other of which along its periphery terminates in a flange which is received in said channel and wherein hardenable adhesive means is introduced in said channel to provide said sealing means.

3. In an automotive vehicle having a vehicle body shell including a pair of horizontally spaced generally vertically extending side pillars for receiving a windshield and body side and bottom structure which defines a passenger compartment and an engine compartment, a preassembled module including a dashboard with various vehicle accessories mounted thereto which are accessible from the passenger compartment, the module being connected as a unit to the vehicle body structure, the improvement being that said module includes a base extending transversely of the vehicle body shell which forms a fire wall for the vehicle to separate the engine compartment from the passenger compartment and to which the dashboard and dashboard mounted accessories are preassembled and to which various engine compartment accessories are assembled, said module having first tapered connecting means including tapered faces and being connected to said body structure of the vehicle by lowering the same through the windshield opening and with the first connecting means thereof cooperably engaging second tapered connecting means including tapered faces secured to said side body structure to connect and automatically center said module to position the same in a horizontal plane on said body shell, said second connecting means and said base of said module having cooperating flange means for fixing the position of the module in a vertical direction when said module is mounted to said body shell, fastening means for fastening said first and second tapered connecting means together and sealing means for sealing the base of the module along its lower and side peripheries to said body shell.

4. In an automotive vehicle in accordance with claim 3 and wherein one of said base and said body shell at its side and bottom structure along its periphery terminates in a channel and other of which along its periphery terminates in a flange which is received in said channel and wherein hardenable adhesive means is introduced in said channel to provide said sealing means.

5. In an automotive vehicle in accordance with claim 3 and wherein said fastening means comprises conically beveled bolts which cooperably engage aligned conically beveled depressions in said second and first connecting means to establish a solid connection between said module and body shell when tightened.

6. In an automotive vehicle having a vehicle body shell including a pair of horizontally spaced generally vertically extending side pillars for receiving a windshield and body side and bottom structure which defines a passenger compartment and an engine compartment, a preassembled module including a dashboard with various vehicle accessories mounted thereto which are accessible from the passenger compartment, the module being connected as a unit to the vehicle body structure, the improvement being that said module includes a base extending transversely between the body side structure of the vehicle body shell and which has a generally vertically extending transverse support portion and a generally horizontally extending support portion to which the dashboard and associated accessories are attached, said base forming a fire wall for the vehicle to separate the engine compartment from the passenger compartment and which defines with the dashboard a water vessel, said base also having various engine compartment accessories preassembled thereto on its side facing the engine compartment, said module having first tapered connecting means including tapered faces and being connected to said body structure of the vehicle by lowering the same through the windshield opening and with the first connecting means thereof cooperably engaging second tapered connecting means including tapered faces secured to said side body structure to connect and to automatically center and position said module to said body shell, fastening means for fastening said first and second connecting means together and sealing means for sealing the base of the module along its lower and side peripheries to said body shell.

* * * * *